US012637308B2

(12) United States Patent
Aoki

(10) Patent No.: US 12,637,308 B2
(45) Date of Patent: May 26, 2026

(54) IMAGE FORMING APPARATUS

(71) Applicant: CANON KABUSHIKI KAISHA, Tokyo (JP)

(72) Inventor: Tomoki Aoki, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/602,436

(22) Filed: Mar. 12, 2024

(65) Prior Publication Data

US 2024/0317517 A1 Sep. 26, 2024

(30) Foreign Application Priority Data

Mar. 24, 2023 (JP) ................................ 2023-048584

(51) Int. Cl.
*B65H 3/48* (2006.01)
*B65H 1/04* (2006.01)
*G03G 15/00* (2006.01)

(52) U.S. Cl.
CPC ................ *B65H 1/04* (2013.01); *B65H 3/48* (2013.01); *G03G 15/6514* (2013.01); *B65H 2402/442* (2013.01); *B65H 2404/74* (2013.01); *B65H 2405/354* (2013.01); *B65H 2406/10* (2013.01)

(58) Field of Classification Search
CPC .......... B65H 2402/441; B65H 2402/45; B65H 2402/412; B65H 2405/12; B65H 2405/121; B65H 3/60; B65H 3/48; B65H 2407/21
See application file for complete search history.

(56) References Cited

U.S. PATENT DOCUMENTS 8,727,343 B2 * 5/2014 Sakamoto ................ B65H 1/04 271/96
9,037,073 B2 * 5/2015 Aoyama ............ G03G 21/1695 399/392
2012/0213564 A1 * 8/2012 Tashiro .............. G03G 21/1633 399/335

FOREIGN PATENT DOCUMENTS

JP 2000095395 A 4/2000
JP 2003173125 A 6/2003

* cited by examiner

*Primary Examiner* — Howard J Sanders
(74) *Attorney, Agent, or Firm* — ROSSI, KIMMS & McDOWELL LLP

(57) ABSTRACT

An image forming apparatus includes an image forming unit, an apparatus body, an opening/closing unit pivotably supported by the apparatus body, the opening/closing unit having an outside surface that forms a side surface of the apparatus body in a first direction, and a sheet supporting portion pivotably supported by the apparatus body, and a feeding member configured to feed the sheet. The opening/closing unit includes a grip portion configured to be gripped to move the opening/closing unit. When viewed in a second direction opposite to the first direction in a state where the opening/closing unit and the sheet supporting portion are closed, a portion of the opening/closing unit is not covered by the sheet supporting portion, and the grip portion of the opening/closing unit is covered by the sheet supporting portion.

17 Claims, 10 Drawing Sheets

IMAGE FORMING APPARATUS

BACKGROUND OF THE INVENTION

Field of the Invention

The present disclosure relates to an image forming apparatus that forms an image on a sheet.

Description of the Related Art

An image forming apparatus such as a printer, a copier, or a multifunction peripheral may include an opening/closing unit (door unit) that is openable or closable to enable access to the inside of an apparatus body on a side portion of the apparatus body of the image forming apparatus. In addition, the image forming apparatus may include a manual feed tray or a multi-purpose tray on which a sheet can be placed from the outside of the image forming apparatus on the same side as the opening/closing unit is provided. Japanese Patent Application Laid-Open No. JP 2000-095395 A discloses an image forming apparatus including a door that is openable and closable with respect to an apparatus body and a manual feed tray that is pivotably supported by a frame of the door.

SUMMARY OF THE INVENTION

The present invention provides an image forming apparatus that can be less likely to be erroneously operated.

According to an aspect of the invention, an image forming apparatus includes an image forming unit configured to form an image on a sheet, an apparatus body configured to house the image forming unit, an opening/closing unit pivotably supported by the apparatus body and openable and closable with respect to the apparatus body, the opening/closing unit having an outside surface that forms a side surface of the apparatus body in a first direction in a state where the opening/closing unit is closed, and a sheet supporting portion configured to support the sheet, the sheet supporting portion being pivotably supported by the apparatus body and being openable and closable with respect to the apparatus body, wherein at least a portion of the sheet supporting portion is located outside the outside surface of the opening/closing unit in the first direction in a state where the opening/closing unit and the sheet supporting portion are closed, and a feeding member configured to feed the sheet supported by the sheet supporting portion toward the image forming unit in a state where the sheet supporting portion is opened, wherein the opening/closing unit includes a grip portion configured to be gripped to move the opening/closing unit, and wherein when the image forming apparatus is viewed in a second direction opposite to the first direction in a state where the opening/closing unit and the sheet supporting portion are closed, a portion of the opening/closing unit is not covered by the sheet supporting portion, and the grip portion of the opening/closing unit is covered by the sheet supporting portion.

Further features of the present invention will become apparent from the following description of exemplary embodiments with reference to the attached drawings.

DESCRIPTION OF THE EMBODIMENTS

Hereinafter, embodiments according to the present disclosure will be described with reference to the drawings.

Image Forming Apparatus

Figure 1:
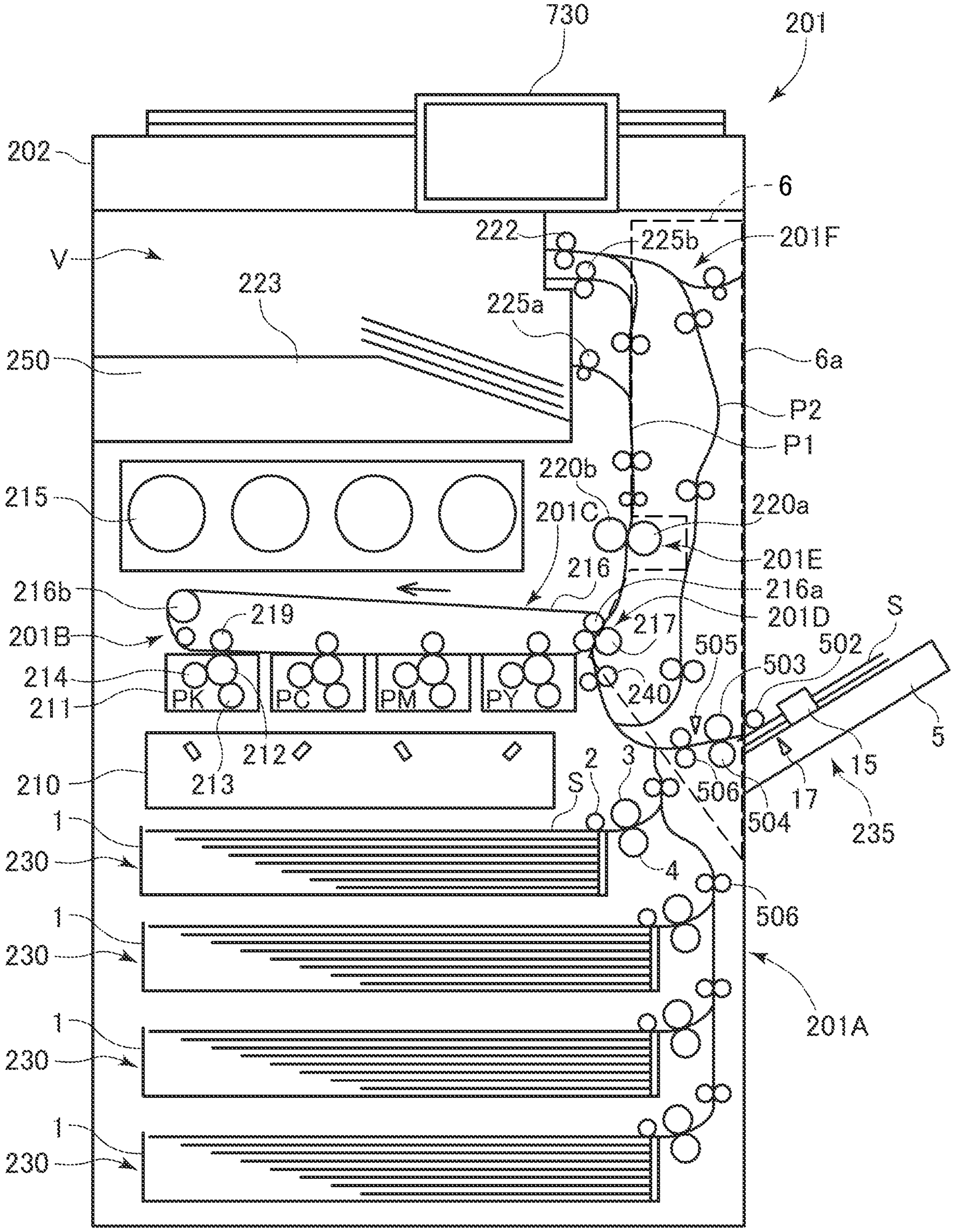
FIG. 1 is a schematic diagram of an image forming apparatus according to an embodiment.
Figure 2:
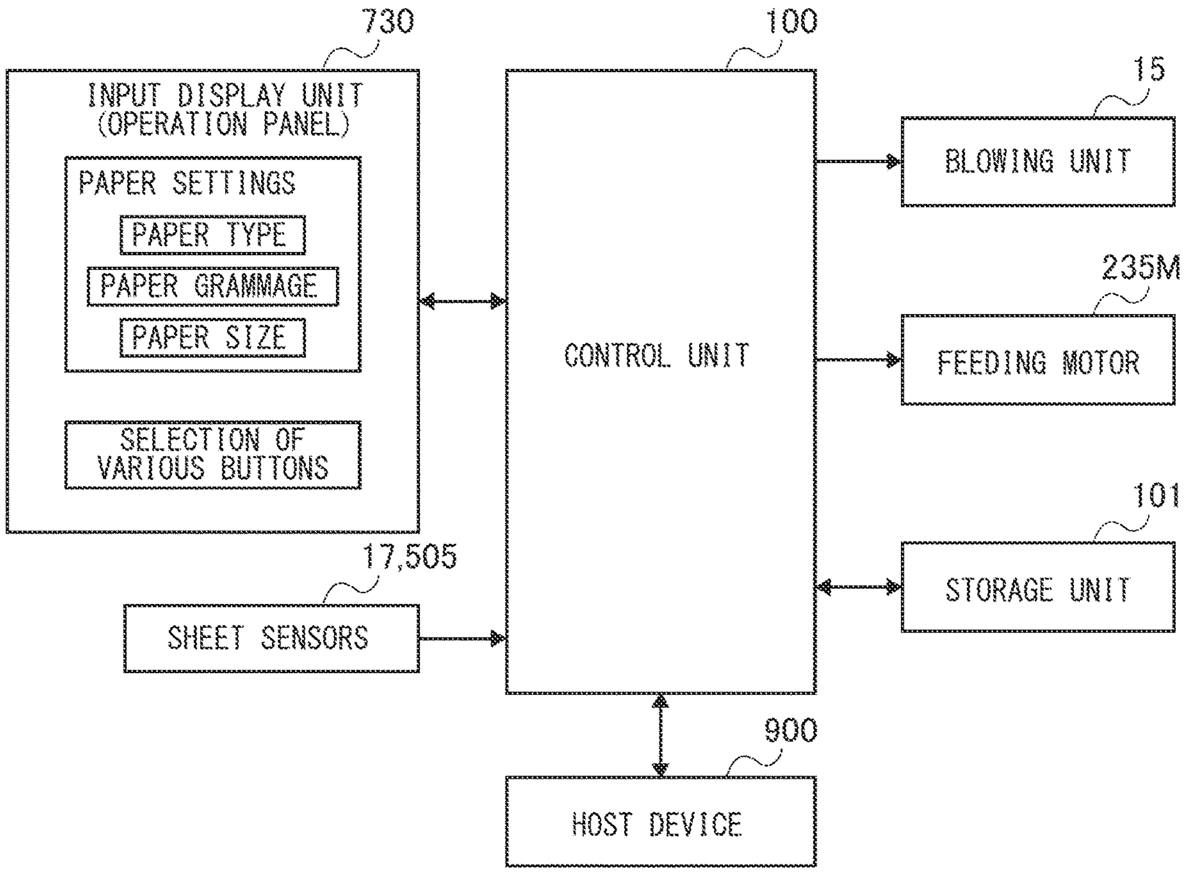
FIG. 2 is a block diagram illustrating a control unit of the image forming apparatus according to the embodiment.

FIG. 1 is a schematic view illustrating a cross section of an image forming apparatus 201 according to an embodiment. FIG. 2 is a block diagram illustrating a configuration of the image forming apparatus 201.

As illustrated in FIG. 1, the image forming apparatus 201 is a tandem-intermediate transfer-type laser beam printer using an electrophotographic process. The image forming apparatus 201 can execute an image forming operation of forming a full-color image or a monochrome image on a sheet S based on image information. As the sheet S that is a recording medium (recording material), various sheet materials that are different in size and material, such as paper such as plain paper and thick paper, a sheet material subjected to surface treatment such as coated paper, a sheet material having a special shape such as an envelope and index paper, a plastic film, and cloth, can be used.

The image forming apparatus 201 includes an apparatus body 201A that houses an image forming unit 201B, and an image reading unit 202 disposed above the apparatus body 201A to read image information from a document. A discharge space V for discharge a sheet is formed between the image reading unit 202 and the apparatus body 201A. The image forming unit 201B according to the present embodiment, which is an example of an image forming unit, is an intermediate transfer-type electrophotographic unit including four image forming stations PY, PM, PC, and PK, an intermediate transfer unit 201C, and a fixing unit 201E.

The image forming stations PY to PK perform an electrophotographic process to create yellow, magenta, cyan, and black toner images, respectively, on photosensitive drums 212. That is, when the image forming stations PY to PK are requested to create toner images, the photosensitive drums 212 as image bearing members are driven to rotate, and charging units 213 uniformly charge the surfaces of the photosensitive drums 212. An exposing unit 210 provided in a lower portion of the apparatus body 201A is driven by an image signal (a video signal) generated based on image information to irradiate the photosensitive drums 212 with laser light to expose the photosensitive drums 212. As a result, electrostatic latent images corresponding to the image information are formed on the surfaces of the photosensitive drums 212. Developing units 214 supply developer (toner) to the photosensitive drums 212 to develop the electrostatic latent images on the photosensitive drums 212 into toner images. Note that toner cartridges 215 for supplying yellow, magenta, cyan, and black toners to the corresponding developing units 214 of the image forming stations PY, PM, PC, and PK, respectively, are installed above the image forming unit 201B.

The toner images of the respective colors formed by the image forming stations PY to PK are primarily transferred from the photosensitive drums 212 to an intermediate transfer belt 216 by primary transfer rollers 219. Adhering substances such as toners remaining on the photosensitive drums 212, not being transferred to the intermediate transfer belt 216, are removed by respective cleaning units provided in the image forming stations PY to PK.

The intermediate transfer unit 201C includes an intermediate transfer belt 216 that is an intermediate transfer member. The intermediate transfer belt 216 is wound by a plurality of rollers including a secondary transfer inner roller 216*a* (drive roller) and a tension roller 216*b*, and is driven to rotate in a counterclockwise direction in the drawing. In a case where a color image is formed, toner images of respective colors created in the image forming stations PY to PK are multiply transferred to overlap each other on the intermediate transfer belt 216. The toner images carried on the intermediate transfer belt 216 are conveyed toward a secondary transfer portion 201D by the rotation of the intermediate transfer belt 216.

A secondary transfer roller 217 is disposed as a transfer portion at a position facing the secondary transfer inner roller 216*a* with the intermediate transfer belt 216 interposed therebetween. The secondary transfer portion 201D is formed as a nip portion between the secondary transfer roller 217 and the intermediate transfer belt 216. The toner images carried on the intermediate transfer belt 216 and conveyed to the secondary transfer portion 201D are secondarily transferred to the sheet S in the secondary transfer portion. Adhering substances such as toners remaining on the intermediate transfer belt 216, not being transferred to the sheet S, are removed by a belt cleaning unit.

The sheet S to which the toner images have been transferred is delivered to the fixing unit 201E. The fixing unit 201E according to the present embodiment includes a fixing roller 220*b* and a pressure roller 220*a* that nip the sheet S, and a heating unit such as a halogen lamp that heats the fixing roller 220*b*. The fixing unit 201E fixes the toner images to the sheet S by heating and pressurizing the toner images on the sheet S while conveying the sheet S in a nipped state at the nip portion between the fixing roller 220*b* and the pressure roller 220*a*.

In parallel with the operation of the image forming unit 201B as described above, the sheet S is fed from a cassette feeder 230 or a manual feeder 235 (multi-feeder) toward the image forming unit 201B.

The cassette feeder 230 includes a feeding cassette 1 as a sheet storage unit and a feeding unit that feeds a sheet S from the feeding cassette 1. The feeding unit according to the present embodiment includes a pickup roller 2 that feeds an uppermost sheet S of the sheets stacked on the feeding cassette 1 from the feeding cassette 1, and a pair of separation rollers that separate the sheets S received from the pickup roller 2 one by one and conveys the sheet S. The pair of separation rollers include a conveyance roller (feed roller) 3 that rotates along a sheet feeding direction, and a separation roller 4 that is brought into contact with the conveyance roller 3 to form a nip portion (a separation nip) to apply a frictional force to the sheet S at the separation nip. When a plurality of sheets S enter the separation nip, the movement of the sheets S other than the uppermost sheet S in contact with the conveyance roller 3 in the sheet feeding direction is hindered by the frictional force received from the separation roller 4.

The manual feeder 235 is disposed on a side portion (a right side portion) in a right direction (a first direction in the present embodiment) of the apparatus body 201A when the image forming apparatus 201 is viewed from the front surface side. Note that the "front surface side" or "front side" of the image forming apparatus 201 is a side on which a user mainly accesses the apparatus body 201A at the time of using the image forming apparatus 201. The front surface side of the image forming apparatus 201 can be confirmed, for example, by a user manual. The front surface side of the image forming apparatus 201 according to the present embodiment is a front side of the paper of FIG. 1 (a side on which an input display unit 730 is disposed). Hereinafter, the "right side" of the apparatus body 201A indicates a right side (a right side in the viewpoint of FIG. 1) when the image forming apparatus 201 is viewed from the front surface side.

The manual feeder 235 includes a manual feed tray 5 (multi-tray) as a sheet supporting portion that supports sheets S, and a feeding unit that feeds the sheets S from the manual feed tray 5. The feeding unit of the manual feeder 235 can have a configuration similar to that of the feeding unit of the cassette feeder 230. That is, the feeding unit includes a pickup roller 502 that feeds an uppermost sheet S of the sheets stacked on the manual feed tray 5 from the manual feed tray 5, and a pair of separation rollers that separates the sheets S received from the pickup roller 502 one by one and conveys the sheet S. The pair of separation rollers include a conveyance roller (feed roller) 503 that rotates along a sheet feeding direction, and a separation roller 504 that is brought into contact with the conveyance roller 503 to form a nip portion (a separation nip) to apply a frictional force to the sheet S at the separation nip. When a plurality of sheets S enter the separation nip, the movement of the sheets S other than the uppermost sheet S in contact with the conveyance roller 503 in the sheet feeding direction is hindered by the frictional force received from the separation roller 504. The manual feeder 235 will be described in detail below.

Note that the above-described configuration of the feeding units of the cassette feeder 230 and the manual feeder 235 is an example of a feeding method of feeding a sheet, and another feeding method may be used. For example, a feeding unit in which a roller member that feeds a sheet from the manual feed tray 5 is in contact with a pad-shaped elastic member (a friction pad or a separation pad) may be used.

The sheet S fed from the cassette feeder 230 or the manual feeder 235 is conveyed to a registration roller pair 240 via a conveyance roller pair 506. After correcting the skew of the sheet S, the registration roller pair 240 conveys the sheet S to the secondary transfer portion 201D at a conveyance timing synchronized with the creation of the toner images by the image forming unit 201B.

Thereafter, the sheet S on which an image is formed by passing through the secondary transfer portion 201D and the fixing unit 201E is sent to a first sheet discharge roller pair 225*a*, a second sheet discharge roller pair 225*b*, or a reverse conveyance roller pair 222. A path from the registration roller pair 240 to the first sheet discharge roller pair 225*a*, the second sheet discharge roller pair 225*b*, or the reverse conveyance roller pair 222 via the secondary transfer portion 201D and the fixing unit 201E is a main conveyance path P1 on which an image is formed.

In a case where an image is formed on only one side of the sheet S (single-sided printing), the sheet S having the image formed on the first side is discharged to the discharge space V by the first sheet discharge roller pair 225*a* or the second sheet discharge roller pair 225*b*. The discharged sheet S is stacked on a stacking portion (a sheet discharge tray) 223 provided at a bottom portion of the discharge space V. In a case where images are formed on both sides of the sheet S (double-sided printing), the sheet S having an image formed on the first side is reversely conveyed (switched back) by the reverse conveyance roller pair 222 and sent to a duplex conveyance unit 201F.

The duplex conveyance unit 201F includes a re-conveyance path P2 from the reverse conveyance roller pair 222 toward the registration roller pair 240, and a plurality of conveyance roller pairs arranged along the re-conveyance path P2. The duplex conveyance unit 201F again conveys the sheet S reversed by the reverse conveyance roller pair 222 toward the image forming unit 201B. Then, the sheet S having an image formed on the second surface by passing through the secondary transfer portion 201D and the fixing unit 201E again is discharged to the discharge space V by the first sheet discharge roller pair 225*a* or the second sheet discharge roller pair 225*b*, and is stacked on the stacking portion 223. At least a part of the duplex conveyance unit 201F is disposed on a door 6 to be described below.

The image forming unit 201B described above is an example of an image forming unit. A direct transfer type electrophotographic unit that transfers a toner image from a photosensitive drum to a sheet without an intermediate transfer member may be used. In addition, the image forming unit is not limited to the electrophotographic-type image forming unit, and an inkjet-type or offset printing-type image forming unit may be used.

Control Unit

As illustrated in FIG. 2, the image forming apparatus 201 includes a control unit 100 as a controller or a control circuit that collectively controls the operations of the image forming apparatus 201. The control unit 100 includes a processor (CPU) that executes a program. The control unit 100 is connected to a storage unit 101, an input display unit 730, a blowing unit 15, a feeding motor 235M, and sheet sensors 17 and 505 in the image forming apparatus 201. Further, the control unit 100 is communicably connected to a host device 900 outside the image forming apparatus 201, so that image information can be received from the host device 900. The host device 900 is a personal computer, an image scanner, a facsimile, or the like.

The input display unit 730 (see FIG. 1 as well) is an operation unit (operation panel) serving as a user interface of the image forming apparatus 201. The input display unit 730 includes a display device such as a liquid crystal panel and an input device such as a touch panel function of the liquid crystal panel and various buttons (a print execution button and the like). The control unit 100 can present information to the user by display a screen on the input display unit 730. In addition, the control unit 100 can receive setting information for the image forming apparatus 201 or an instruction from the user input to the input display unit 730 by a user operation. The setting information is, for example, attribute information of a sheet used in an image forming operation (paper settings). The paper settings include a paper type (e.g., whether coated paper or not), a paper grammage, and a paper size.

The storage unit 101 stores a program for controlling the image forming apparatus 201 and data used for controlling the image forming apparatus 201. The CPU of the control unit 100 reads the program from the storage unit 101 and executes the program to control the operation of each unit of the image forming apparatus 201. For example, the CPU of the control unit 100 controls the operations of the blowing unit 15 and the feeding motor 235M based on a detection signal of the sheet sensor 17, thereby executing an operation of feeding a sheet from the manual feeder 235.

The feeding motor 235M is a drive source that drives the feeding unit of the manual feeder 235. The sheet sensor 17 is a sensor (a sheet presence/absence sensor) that detects whether there is a sheet S on the manual feed tray 5 (see FIG. 1 as well). The sheet sensor 505 is a sensor (a conveyance sensor) that detects that a leading edge and a trailing edge of the sheet S fed from the manual feed tray 5 have passed (see also FIG. 1). The blowing unit 15 will be described below.

The image forming apparatus 201 according to the present embodiment can continuously feed coated paper from the manual feeder 235. That is, in a state where a plurality of sheets of coated paper are stacked on the manual feed tray 5, by instructing an image forming operation (inputting an image forming job) once, an image can be formed on each sheet of the coated paper while the sheets of coated paper are continuously fed one by one from the manual feed tray 5. In a case where the control unit 100 determines that it is highly necessary to enhance the separability between sheets S based on the sheet settings, the blowing unit 15 is operated at the time of executing an operation of feeding sheets from the manual feeder 235 to blow loosening air to the sheets on the manual feed tray 5. The case where it is highly necessary to enhance the separability between sheets is a case where the sheets are likely to stick to each other and two or more sheets are likely to be fed together, for example, due to coated paper, a large paper grammage, a large paper size (e.g., A3 size), and the like.

Manual Feeder

Figure 3:
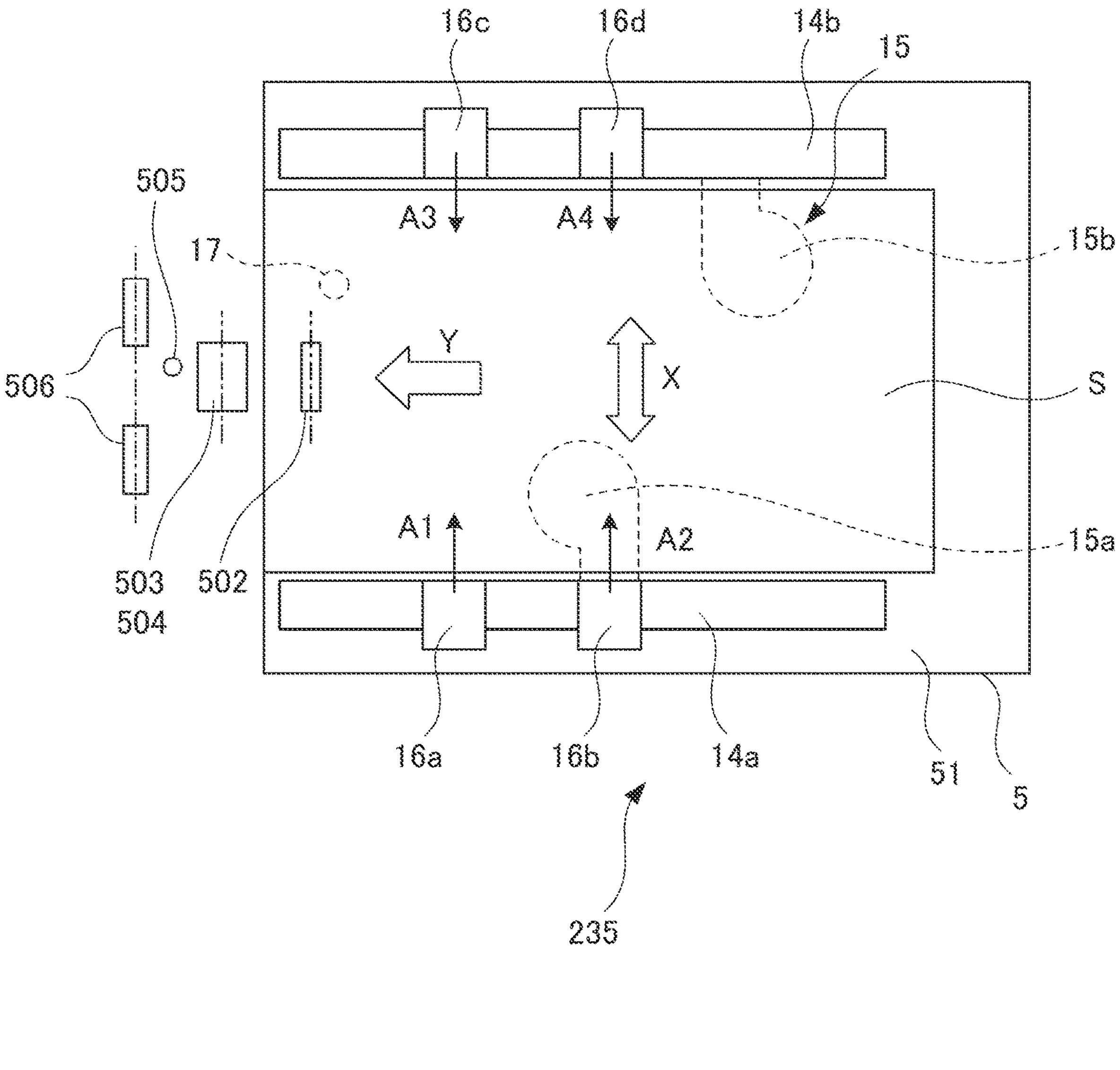
FIG. 3 is a view illustrating a manual feeder according to the embodiment.

The manual feeder 235 will be described with reference to FIG. 3. FIG. 3 is a schematic view of the manual feeder 235 as viewed from above the manual feed tray 5.

As described above, the manual feeder 235 includes a manual feed tray 5, a pickup roller 502, a conveyance roller 503, a separation roller 504, and a conveyance roller pair 506. The manual feed tray 5 is an example of a sheet supporting portion that supports a sheet S, and the pickup roller 502 is an example of a feeding member that feeds the sheet S from the manual feed tray 5.

The manual feed tray 5 is disposed on a right side portion (a side portion in the first direction) of the image forming apparatus 201, and is provided to be openable and closable with respect to the apparatus body 201A. That is, the manual feed tray 5 is movable to a closed position (a tray-closed position or a second closed position) or to an opened position (a tray-opened position or a second opened position) with respect to the apparatus body 201A. In a state where the manual feed tray 5 is opened, the user can place a sheet S on the manual feed tray 5 from the outside of the image forming apparatus 201. A configuration related to the opening and closing of the manual feed tray 5 will be described below.

The manual feeder 235 includes side end regulating plates 14*a* and 14*b*, a blowing unit 15, and blowing nozzles 16*a*, 16*b*, 16*c*, and 16*d*. The blowing unit 15 according to the present embodiment includes two blowing fans 15*a* and 15*b*.

The side end regulating plates 14*a* and 14*b* are a pair of side end regulating members facing each other in a sheet width direction X orthogonal to a sheet feeding direction Y, and regulates a position of a sheet S in the sheet width direction X. The side end regulating plates 14*a* and 14*b* are connected to be interlocked with each other in the sheet width direction X via a rack and pinion mechanism (interlocking mechanism) disposed in a space behind a placement surface 51 (a support surface, sheet supporting surface) of the manual feed tray 5.

The blowing fans 15*a* and 15*b* generate wind (hereinafter referred to as loosening air) to be blown onto the sheet S stacked on the manual feed tray 5. Each of the blowing fans 15*a* and 15*b* includes a blade portion and a fan motor, and rotate by receiving power supplied from a power supply circuit in the apparatus body 201A. As the blowing fans 15*a* and 15*b*, for example, sirocco fans having high quietness can be used, but other fans such as propeller fans (axial flow fans) may be used. The number of blowing fans 15*a* and 15*b*, the number and arrangement of blowing nozzles 16*a* to 16*d*, and the like can be appropriately modified.

The blowing fans 15*a* and 15*b* can be disposed in the space behind the placement surface 51 of the manual feed tray 5. For example, the blowing fans 15*a* and 15*b* and the above-described rack and pinion mechanism are accommodated in a space between the placement surface 51 and a bottom surface portion 52 (see FIGS. 7 and 10) of the manual feed tray 5. The blowing fans 15*a* and 15*b* are supported by the manual feed tray 5 to move integrally with the manual feed tray 5 with respect to the apparatus body 201A. The blowing fans 15*a* and 15*b* according to the present embodiment are supported by the side end regulating plates 14*a* and 14*b*, respectively, to move integrally with the side end regulating plates 14*a* and 14*b* inside the manual feed tray 5.

The blowing nozzles 16*a* to 16*d* form opening portions that are open on inner surfaces of the side end regulating plates 14*a* and 14*b* in the sheet width direction X. As indicated by flow lines A1 to A4, the loosening air from the blowing fans 15*a* and 15*b* is blown from the blowing nozzles 16*a* to 16*d* to side end portions (end portions in the sheet width direction X) of the sheet S on the manual feed tray 5. As the loosening air enters between the sheets S stacked on the manual feed tray 5, an upward force acts on the upper sheet, and an attraction force between the sheets is reduced. That is, the separability between sheets can be enhanced by the loosening air from the blowing fans 15*a* and 15*b* at the time of feeding the sheets from the manual feeder 235.

When the user inputs an instruction to execute an image forming operation via the input display unit 730 (when the user presses a start button) in a state where the sheet sensor 17 is detecting a sheet S on the manual feed tray 5, an operation of feeding sheets from the manual feeder 235 is started. In this case, the control unit 100 (FIG. 2) determines whether it is necessary to blow loosening air based on the paper settings, and drives the blowing fans 15*a* and 15*b* when it is determined that loosening air is necessary. After a predetermined time elapses from the start of blowing of the loosening air, the control unit 100 drives the pickup roller 502 to rotate in contact with the uppermost sheet S. As a result, the pickup roller 502 feeds the sheets S from the manual feed tray 5 in the sheet feeding direction Y. In a state where the sheets S are further separated one by one by the separation roller pair (503 and 504), the sheets S are conveyed toward the registration roller pair 240 (FIG. 1) via the conveyance roller pair 506. The conveyance of the sheets after the registration roller pair 240 is as described above.

When the manual feeder 235 continuously feeds sheets, feeding of a subsequent sheet is started based on a conveyance timing of a preceding sheet detected by the sheet sensor 505 (e.g., a timing of passing the trailing edge of the sheet in the sheet feeding direction Y). As a result, the manual feeder 235 can feed the plurality of sheets S stacked on the manual feed tray 5 one by one at substantially constant intervals.

Door

The door 6 included in the image forming apparatus 201 will be described. As shown in FIG. 1, the door 6 is an example of an opening/closing unit (a door unit) that is capable of being opened or closed with respect to the apparatus body 201A. The door 6 is disposed on a right side surface portion of the apparatus body 201A, and is supported by a frame body of the apparatus body 201A to pivot around a door pivot shaft 601 to be described below.

As illustrated in FIG. 1, the door 6 is a unit in which a conveyance guide, a conveyance roller, and the like move integrally with respect to the apparatus body 201A. The door 6 according to the present embodiment includes a plurality of conveyance guides and a plurality of conveyance roller pairs forming the re-conveyance path P2 of the duplex conveyance unit 201F, a conveyance roller pair 506 of the manual feeder 235, and a secondary transfer roller 217. In addition, the door 6 includes a door frame that is supported on the apparatus body 201A by the door pivot shaft 601 to be described below and supports a conveyance guide and the like.

The door 6 is movable between a closed position (a door-closed position or a first closed position) or to an opened position (a door-opened position or a first opened position) with respect to the apparatus body 201A. In a state where the door 6 is closed (FIG. 1), an outside surface 6*a* of the door 6 forms a part of an exterior surface (an outer surface) on the right side of the image forming apparatus 201. In addition, in a state where the door 6 is closed and the manual feed tray 5 is opened, the manual feeder 235 can feed a sheet from the manual feed tray 5 toward the image forming unit 201B.

In a state where the door 6 is opened (FIG. 8), the door 6 protrudes rightward with respect to the apparatus body 201A, and a space inside the apparatus body 201A is exposed. By opening the door 6, the user or the service personnel can access a structure (e.g., a member around the main conveyance path P1) inside the apparatus body 201A, which is covered by the door 6 in a state where the door 6 is closed, and perform jam removal, maintenance work, and the like. Further, by opening the door 6, the user or the service personnel can access a member disposed on an inside surface 6*b* of the door 6.

Figure 7:
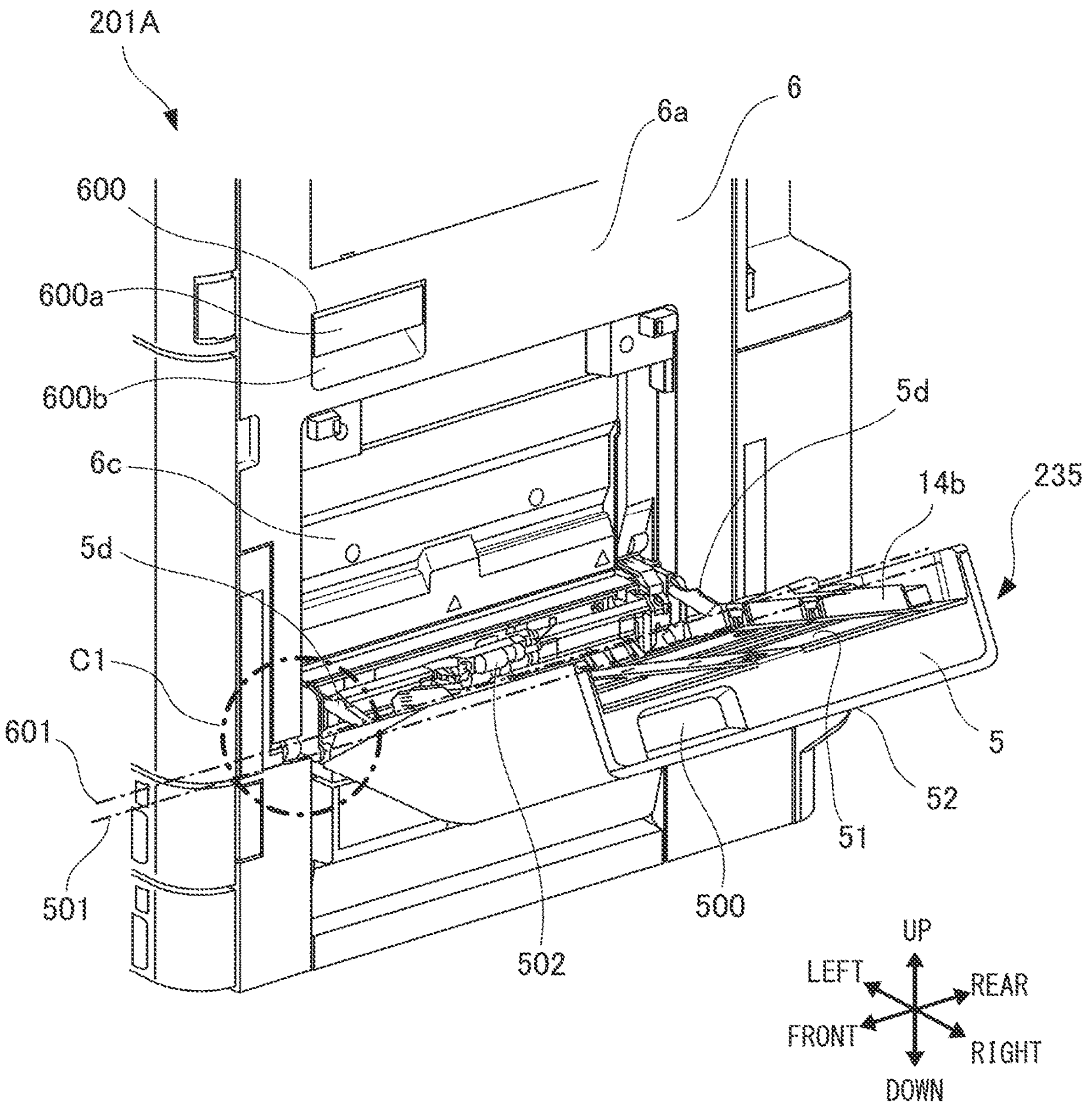
FIG. 7 is a perspective view of a right side portion of the image forming apparatus according to the embodiment.

As illustrated in FIG. 7, the door 6 has a recess portion 6*c* recessed toward the apparatus body 201A as compared with the outside surface 6*a* that is an exterior surface (an outer surface). The recess portion 6*c* forms a space for accommodating at least a portion of a member disposed on the manual feed tray 5 in a state where the manual feed tray 5 is closed. That is, when the image forming apparatus 201 is viewed from the front surface side in a state where the manual feed tray 5 is closed, at least a portion of the member disposed on the manual feed tray 5 is located closer to the apparatus body 201A (left side) than the outside surface 6*a* of the door 6. Examples of the "member disposed on the manual feed tray 5" include the side end regulating plates 14*a* and 14*b*, the blowing nozzles 16*a* to 16*b*, and a link member 5*d* that connects the manual feed tray 5 and the apparatus body 201A to each other to hold the manual feed tray 5 at the opened position.

Opening and Closing of Door and Manual Feed Tray

A support configuration of the door 6 and the manual feed tray 5 in the present embodiment and a positional relationship between the door 6 and the manual feed tray 5 when opened or closed will be described.

Figure 4A:
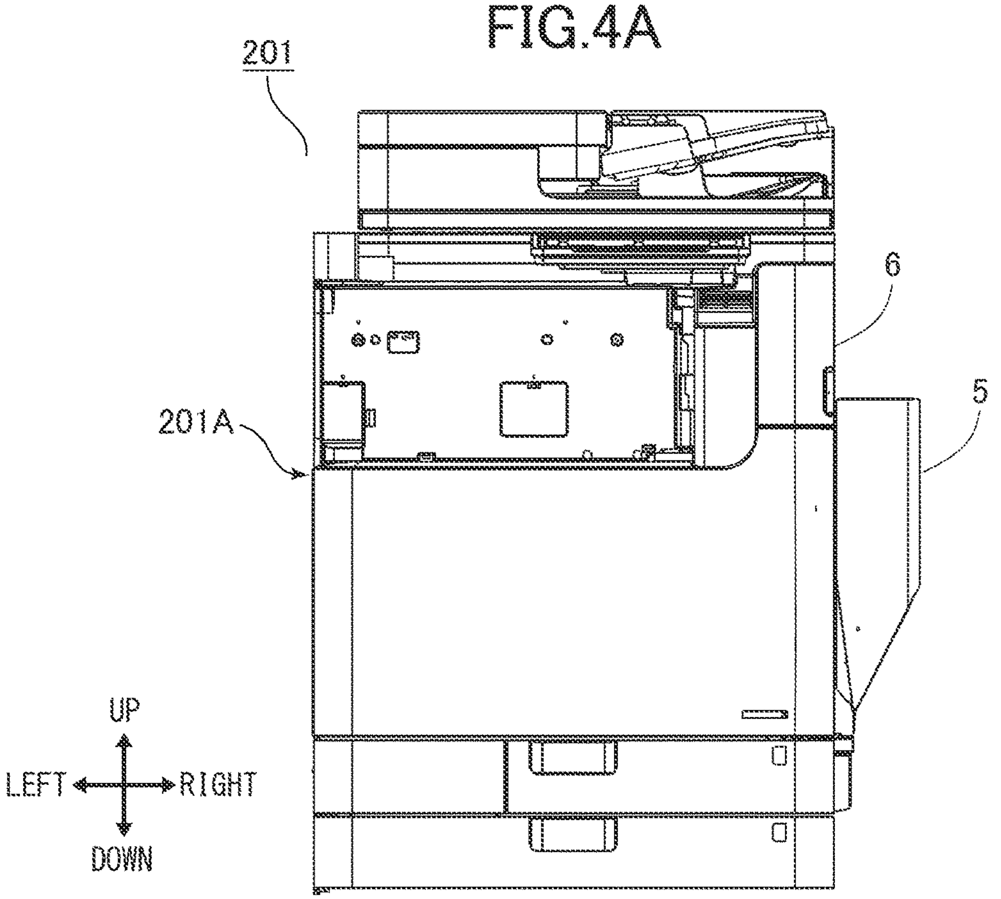
FIG. 4A is a front view of the image forming apparatus according to the embodiment.
Figure 4B:
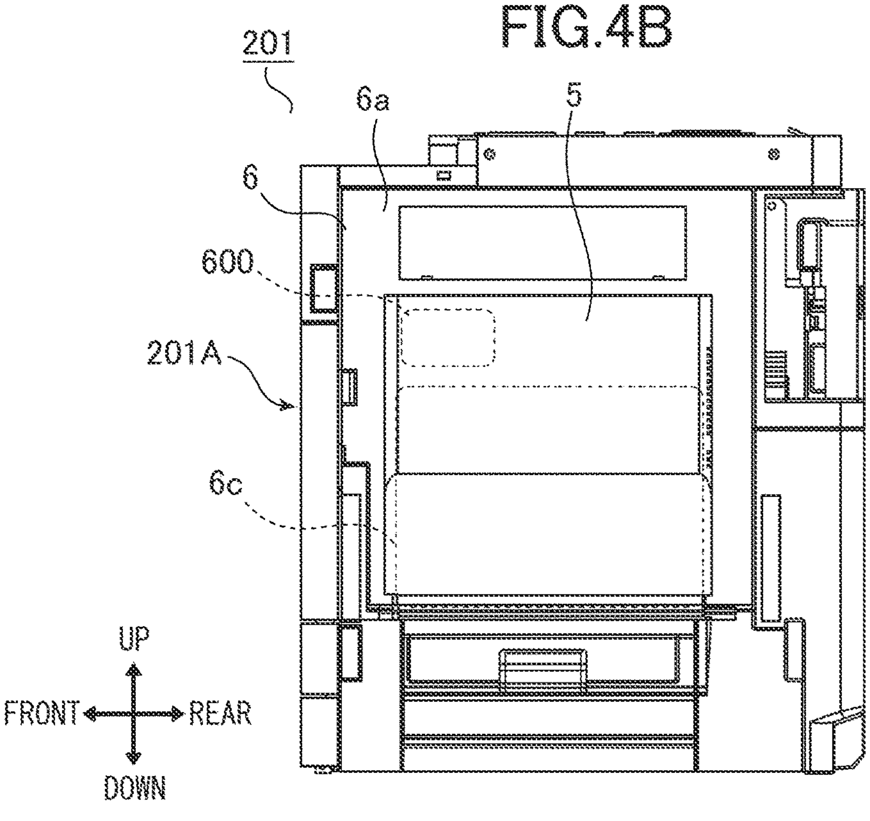
FIG. 4B is a side view of the image forming apparatus according to the embodiment.
Figure 5A:
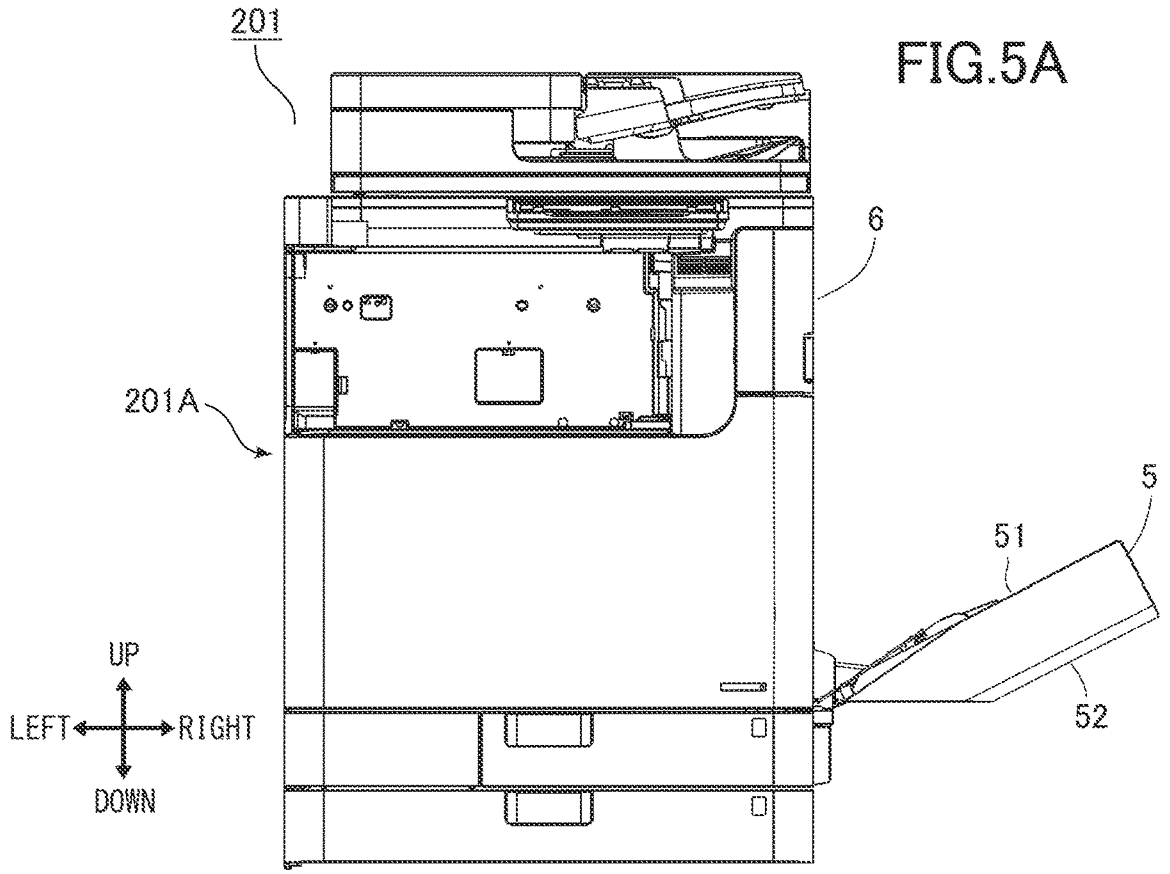
FIG. 5A is a front view of the image forming apparatus according to the embodiment.
Figure 5B:
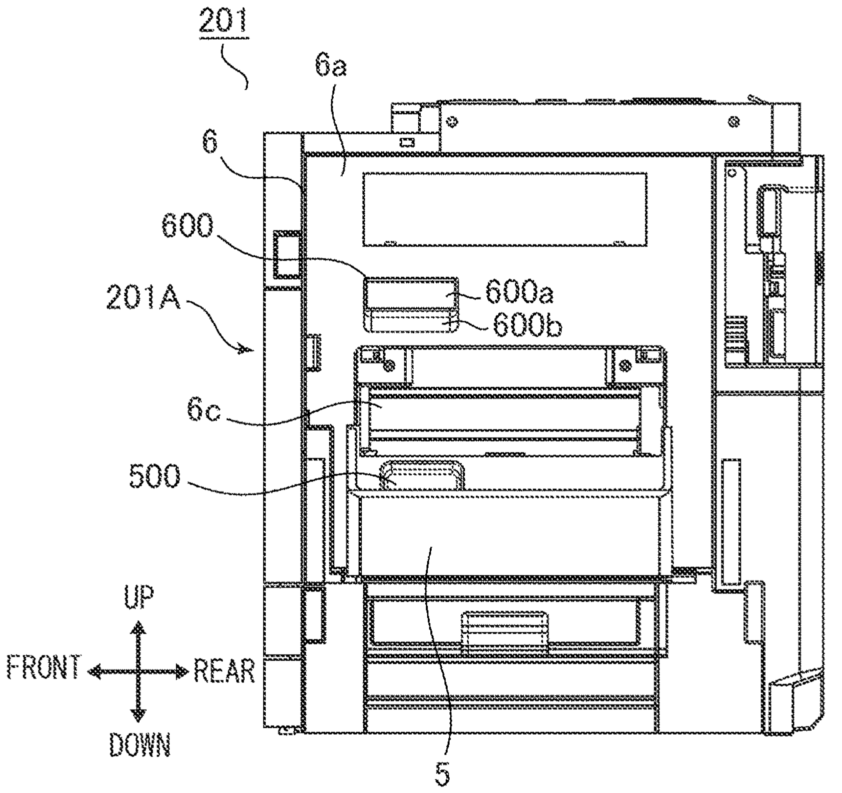
FIG. 5B is a side view of the image forming apparatus according to the embodiment.
Figure 6:
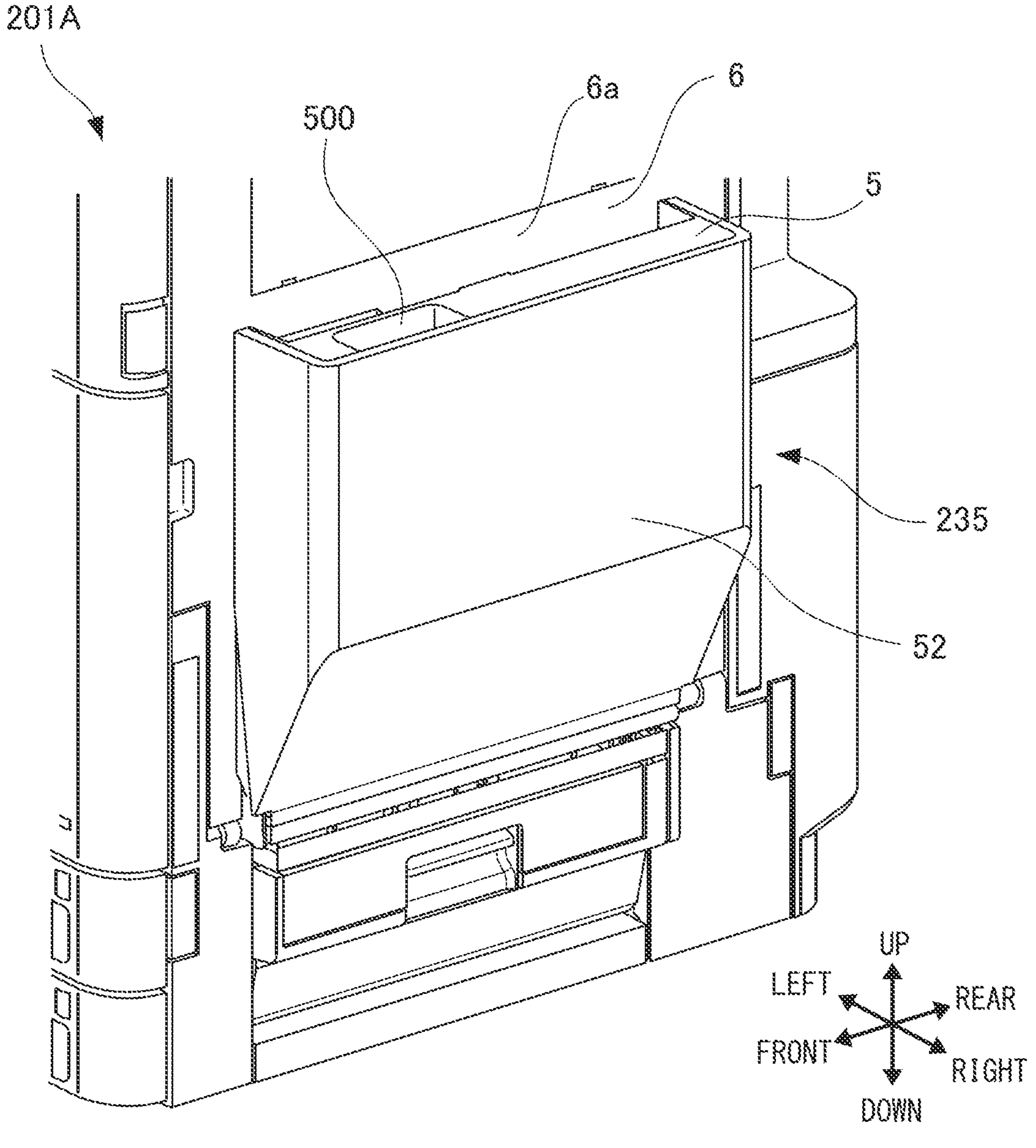
FIG. 6 is a perspective view of a right side portion of the image forming apparatus according to the embodiment.
Figure 8:
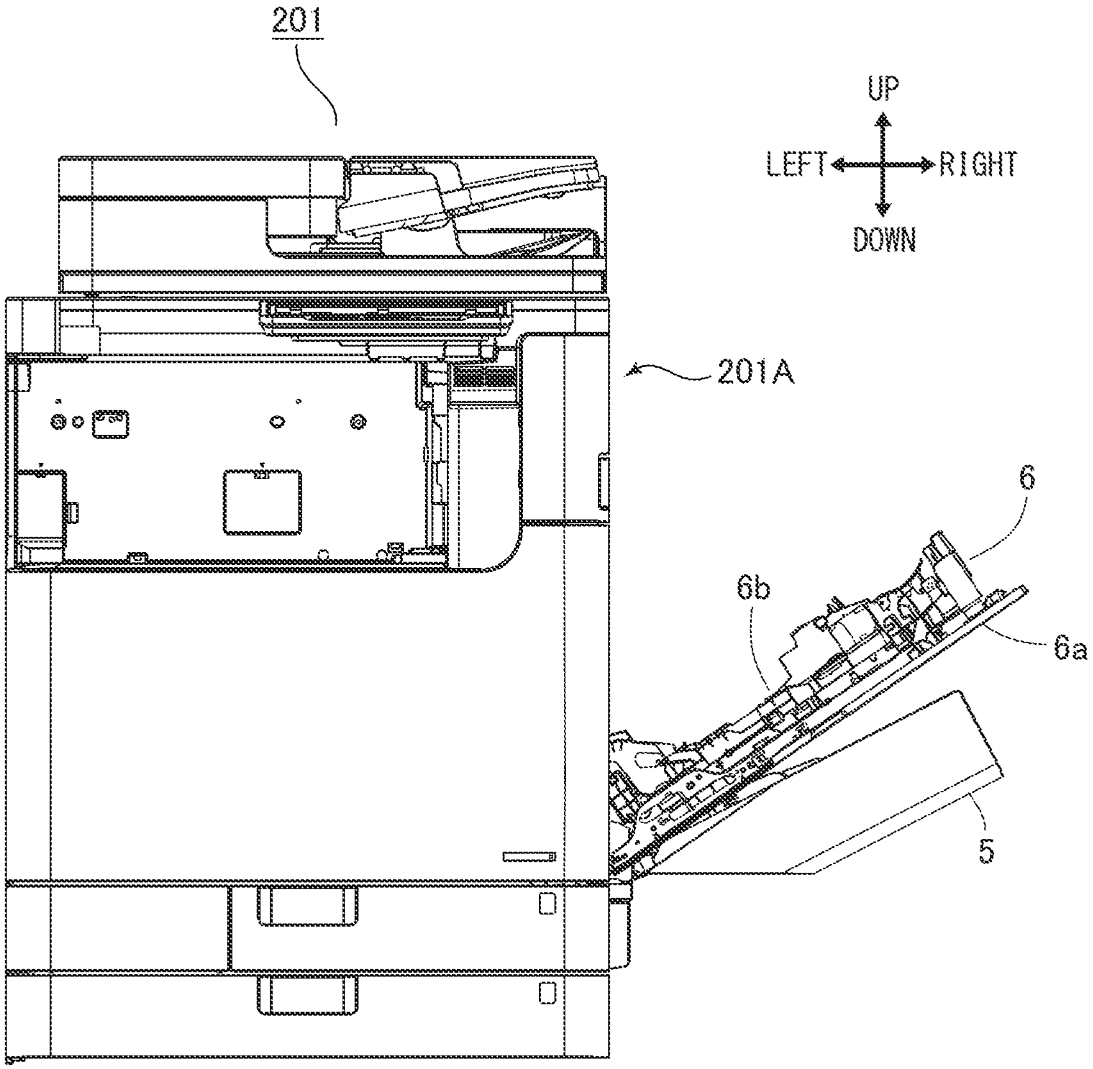
FIG. 8 is a front view of the image forming apparatus according to the embodiment.
Figure 9A:
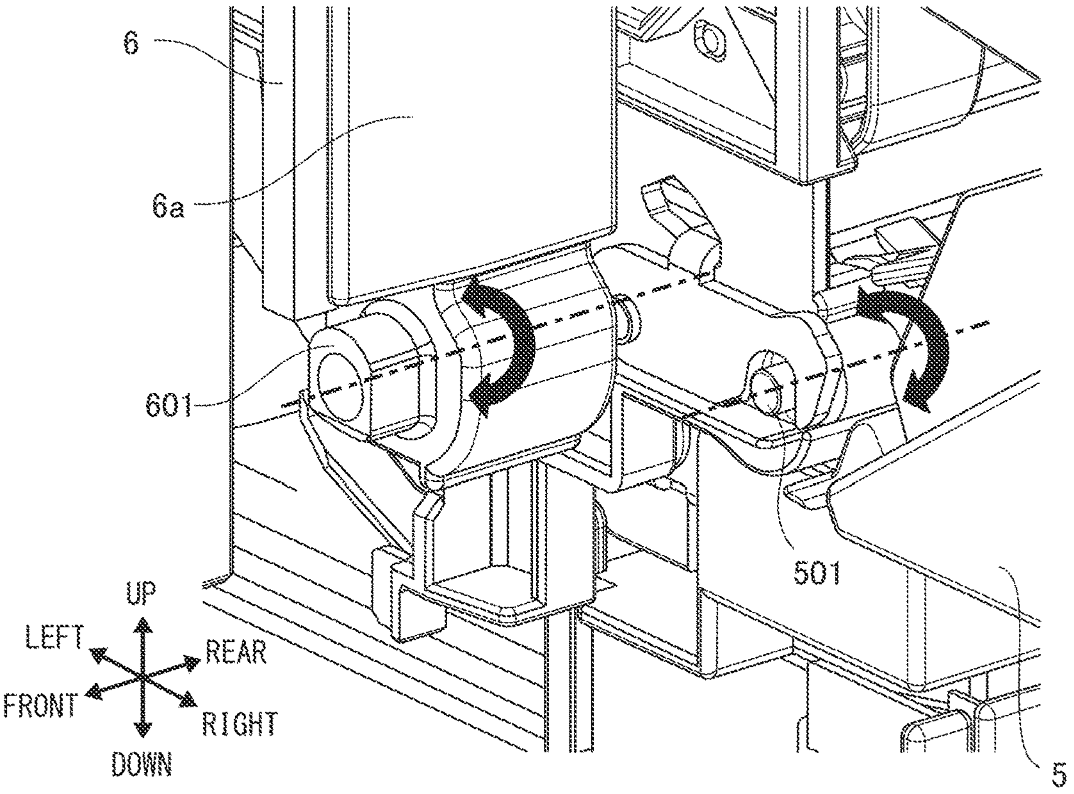
FIG. 9A is a perspective view of a door pivot shaft and a tray pivot shaft according to the embodiment.
Figure 9B:
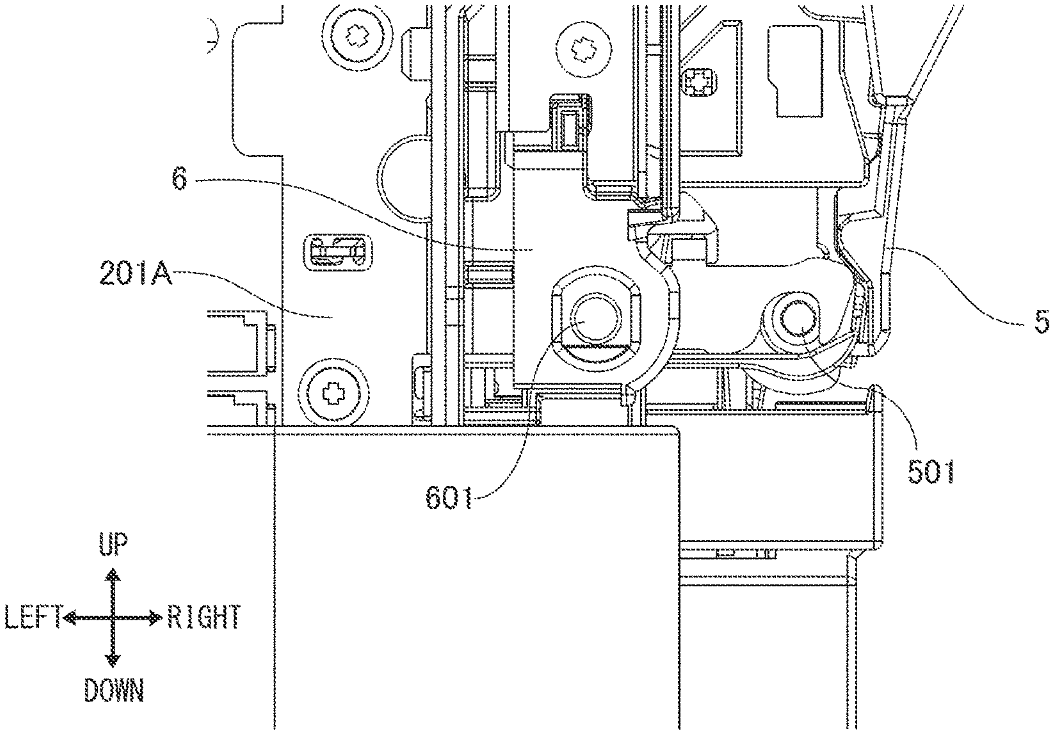
FIG. 9B is a view of the door pivot shaft and the tray pivot shaft according to the embodiment as viewed from the front side.
Figure 10:
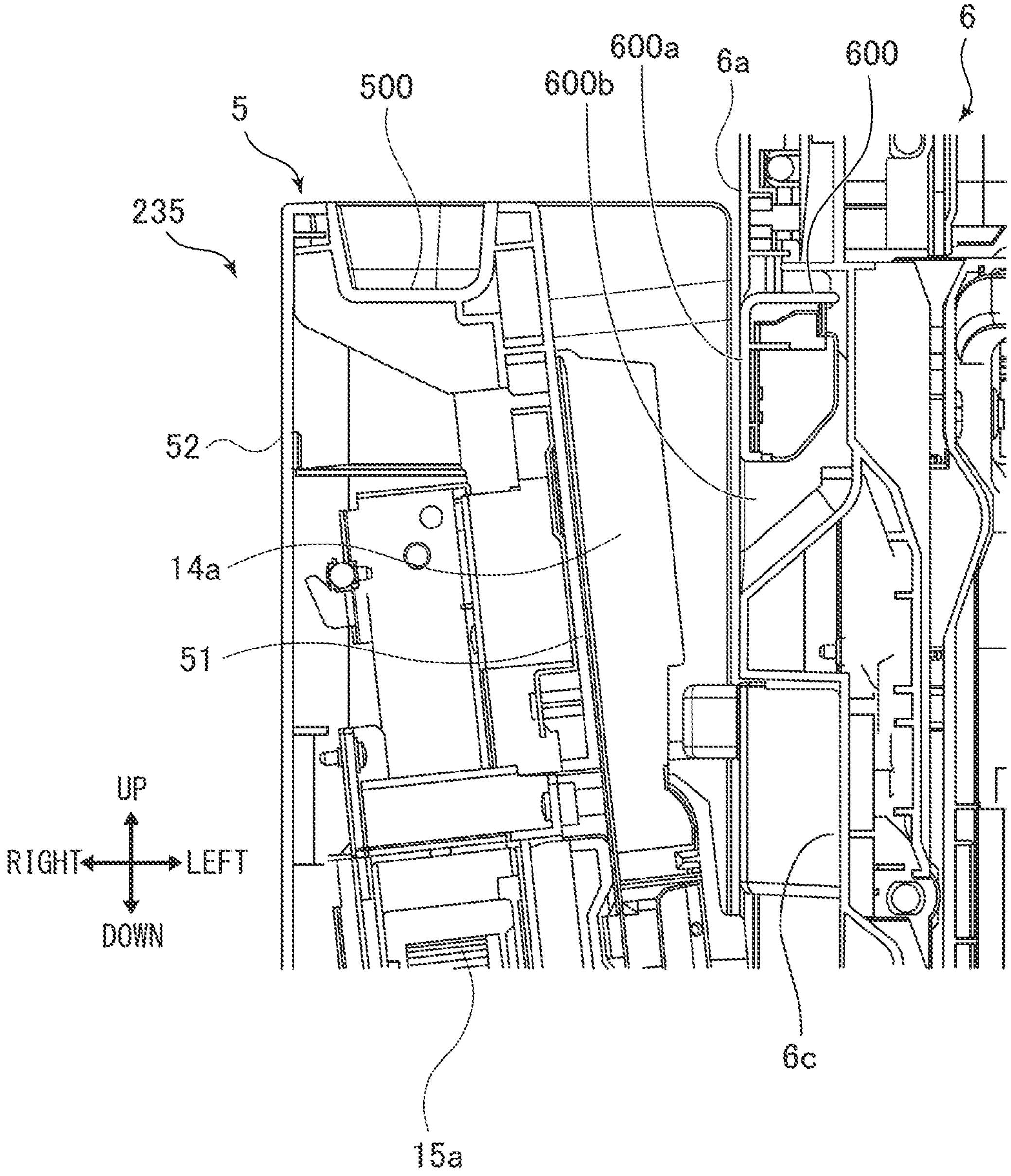
FIG. 10 is a cross-sectional view of the image forming apparatus according to the embodiment.

FIG. 4A is a front view of the image forming apparatus 201 in a state where both the door 6 and the manual feed tray 5 are closed. FIG. 4B is a right side view of the image forming apparatus 201 in a state where both the door 6 and the manual feed tray 5 are closed. FIG. 5A is a front view of the image forming apparatus 201 in a state where the door 6 is closed and the manual feed tray 5 is opened. FIG. 5B is a right side view of the image forming apparatus 201 in a state where the door 6 is closed and the manual feed tray 5 is opened. FIG. 6 is a perspective view illustrating a right side surface of the image forming apparatus 201 in a state where both the door 6 and the manual feed tray 5 are closed. FIG. 7 is a perspective view illustrating a right side surface of the image forming apparatus 201 in a state where the door 6 is closed and the manual feed tray 5 is opened. FIG. 8 is a front view of the image forming apparatus 201 in a state where both the door 6 and the manual feed tray 5 are opened. FIG. 9A is a perspective view (an enlarged view of a circular region C1 in FIG. 7) illustrating a tray pivot shaft 501 and a door pivot shaft 601. FIG. 9B is a view illustrated the tray pivot shaft 501 and the door pivot shaft 601 as viewed from the front surface side of the image forming apparatus 201. FIG. 10 is a cross-sectional view of the image forming apparatus 201 passing through a tray operating portion 500 of the manual feed tray 5 and a door operating portion 600 of the door 6 as viewed from the rear side toward the front side.

As illustrated in FIGS. 4A to 7, the manual feed tray 5 is movable to a closed position (FIGS. 4A, 4B, and 6) or an opened position (FIGS. 5A, 5B, and 7) with respect to the apparatus body 201A. The manual feed tray 5 is provided with a tray operating portion 500 as a grip portion for moving the manual feed tray 5 between the closed position and the opened position (FIGS. 6 and 7). The tray operating portion 500 according to the present embodiment has a recessed shape formed in an upper surface portion of the manual feed tray 5 (see FIG. 10 as well). The user can pull out the manual feed tray 5 from the closed position to the opened position by inserting a hand into the tray operating portion 500 and pulling the manual feed tray 5.

As illustrated in FIGS. 5B and 7, the door 6 is provided with a door operating portion 600 as a grip portion for moving the door 6 between the closed position and the opened position. The door operating portion 600 according to the present embodiment is disposed on the outside surface 6*a* of the door 6. The user can move the door 6 from the closed position to the opened position by inserting a hand into the door operating portion 600 and pulling the door 6. As illustrated in FIGS. 7 and 10, the door operating portion 600 has a grip portion 600*a*, and has a shape capable of gripping the grip portion 600*a* by inserting a hand from a space 600*b* below the grip portion 600*a*. The grip portion 600*a* may have a function as an unlocking lever (a pivotable lever member) that unlocks the door 6 from the apparatus body 201A.

As illustrated in FIGS. 9A and 9B, the door 6 has a door pivot shaft 601. The door pivot shaft 601 is provided at a lower end of the door 6 in a state where the door 6 is closed. The door pivot shaft 601 is pivotably supported by the apparatus body 201A. The door 6 pivots about a center line (a first axis) of the door pivot shaft 601.

The manual feed tray 5 includes a tray pivot shaft 501. The tray pivot shaft 501 is provided at a lower end of the manual feed tray 5 in a state where the manual feed tray 5 is closed. The tray pivot shaft 501 is pivotably supported by the apparatus body 201A. The manual feed tray 5 pivots about a center line (a second axis) of the tray pivot shaft 501.

In the present embodiment, the pivot center (the second axis) of the manual feed tray 5 is different from the pivot center (the first axis) of the door 6. In the present embodiment, both the center line of the door pivot shaft 601 and the center line of the tray pivot shaft 501 extend in the front-rear direction of the image forming apparatus 201. That is, the pivot axis of the manual feed tray 5 is substantially parallel to the pivot axis of the door 6. The term "substantially parallel" means parallel except for errors resulting from component tolerances, assembly tolerances, or play (backlash) between members necessary for assembly.

As illustrated in FIG. 9B, the tray pivot shaft 501 of the manual feed tray 5 is located more outward of the apparatus body 201A than the door pivot shaft 601 of the door 6 in the left-right direction of the image forming apparatus 201. By disposing the tray pivot shaft 501 outside the door pivot shaft 601, it is possible to easily secure a space for pivoting the manual feed tray 5 even in a case where the size of the manual feed tray 5 is large.

When the apparatus body 201A is viewed from the right side of the image forming apparatus 201 in a state where the door 6 and the manual feed tray 5 are closed as illustrated in FIG. 4B, a portion of the door 6 (specifically at least a portion of the outside surface 6*a* of the door 6) is not covered by the manual feed tray 5. In addition, since the door 6 is a large unit including a plurality of conveyance guides and conveyance rollers as described above, the door 6 has a larger area than the manual feed tray 5 when the apparatus body 201A is viewed from the right side of the image forming apparatus 201 in a state where the door 6 and the manual feed tray 5 are closed. However, as will be described below, the door operating portion 600 of the door 6 is covered by the manual feed tray 5.

On the other hand, in a state where the door 6 and the manual feed tray 5 are closed, the recess portion 6*c* of the door 6 is covered by the manual feed tray 5. As a result, when the manual feeder 235 is not used, it is possible to prevent the user from inadvertently touching the roller, the sheet conveyance path, or the like of the manual feeder 235.

In the present embodiment, the door 6 and the manual feed tray 5 are each independently pivotable with respect to the apparatus body 201A. The manual feed tray 5 is disposed outside the door 6. At least a portion of the manual feed tray 5 in the closed state is located outside the outside surface 6*a* of the door 6 in the closed state (on the right side of the image forming apparatus 201) as shown in FIG. 4A. In the present embodiment, the placement surface 51 of the manual feed tray 5 in the closed state is located outside the outside surface 6*a* of the door 6 in the closed state (on the right side of the image forming apparatus 201) as shown in FIG. 10. In the present embodiment, the blowing fans 15*a* and 15*b* of the manual feed tray 5 in the closed state are located outside the outside surface 6*a* of the door 6 in the closed state (on the right side of the image forming apparatus 201) as shown in FIG. 10.

When an operation of opening the door 6 is performed in a state where the manual feed tray 5 is closed, there might be a possibility that the door 6 and the manual feed tray 5 collide with each other, and parts are damaged. In addition, even when the door 6 and the manual feed tray 5 do not directly collide with each other, there might be a possibility that a member interlocked with the opening and closing of the door 6 and a member interlocked with the opening and closing of the manual feed tray 5 collide with each other and are damaged. Therefore, at the time of opening the door 6, it is required to perform an operation of opening the door 6 in a state where the manual feed tray 5 is opened in advance.

Here, as illustrated in FIG. 4B, the door operating portion 600 is covered by the manual feed tray 5 in a state where the door 6 and the manual feed tray 5 are closed. However, FIG. 4B illustrates a state in which the apparatus is viewed in a left direction (a second direction) opposite to the right side (the first direction) of the apparatus body 201A where the door 6 and the manual feed tray 5 are provided. With this configuration, it is possible to reduce a possibility of an erroneous operation in which the door 6 is erroneously opened in a state where the manual feed tray 5 is closed.

In a state where the door 6 and the manual feed tray 5 are closed, preferably, the door operating portion 600 is entirely covered by the manual feed tray 5. But, in a mode in which the door operating portion 600 cannot be gripped, a portion of the door operating portion 600 may be exposed. For example, when the manual feed tray 5 covers the space 600*b* (FIGS. 7 and 10) below the grip portion 600*a* of the door operating portion 600, the door 6 can be prevented from being erroneously operated.

In this manner, in a state where the door 6 and the manual feed tray 5 are closed, the door operating portion 600 (the grip portion) is covered by the manual feed tray 5 (the sheet supporting portion). As a result, it is possible to ensure a correct operation procedure, and to prevent the door 6 from being opened by an incorrect operation procedure, thereby preventing a component from being damaged or the like. That is, according to the present embodiment, it is possible to provide an image forming apparatus that is less likely to be erroneously operated.

In particular, in the present embodiment, the center line of the door pivot shaft 601 (the pivot center of the door 6) and the center line of the tray pivot shaft 501 (the pivot center of the manual feed tray 5) are axis different from each other. Specifically, in the present embodiment, the tray pivot shaft 501 is located outside the door pivot shaft 601 (FIG. 9B). In a case where the center line of the door pivot shaft 601 is different from the center line of the tray pivot shaft 501, a pivot trajectory of the door 6 does not coincide with a pivot trajectory of the manual feed tray 5. In this case, in a case where the door 6 is erroneously opened in a state where the manual feed tray 5 is closed, there is a concern that a strong force is applied to a component due to a difference in pivot trajectory and damage is likely to occur. However, according to the present embodiment, the possibility of erroneous operation can be reduced.

In the present embodiment, since the door operating portion 600 is disposed on the outside surface 6*a*, not in the recess portion 6*c*, of the door 6, the visibility and accessibility of the door operating portion 600 are higher than those in a case where the door operating portion 600 is disposed in the recess portion 6*c*. On the other hand, since the door operating portion 600 is on the outside surface 6*a*, in a case where the manual feed tray 5 having a size that fits the recess portion 6*c* of the door 6 is used in a state where the manual feed tray 5 is closed, the door operating portion 600 is exposed even if the manual feed tray 5 is closed, and there is a concern about an erroneous operation.

In the present embodiment, since the manual feed tray 5 has a larger size than the recess portion 6*c* of the door 6, the door operating portion 600 can be covered by the manual feed tray 5 in a state where the manual feed tray 5 is closed. More specifically, the door operating portion 600 according to the present embodiment is disposed above the recess portion 6*c* of the door 6. The length of the placement surface 51 of the manual feed tray 5 in the sheet feeding direction is longer than the width of the recess portion 6*c* of the door 6 in the up-down direction. With this configuration, in a state where the manual feed tray 5 is closed, the manual feed tray 5 can extend up to a position upper than the upper edge of the recess portion 6*c* of the door 6 to cover the door operating portion 600. Further, since the length of the placement surface 51 is long, a sheet having a larger size can be placed on the manual feed tray 5.

In addition, since the manual feeder 235 according to the present embodiment includes blowing fans 15*a* and 15*b* (FIG. 2) in the manual feed tray 5, it is possible to continuously feed sheets (such as large-sized sheets of coated paper), which are generally difficult to separate, by blowing loosening air. Since the blowing fans 15*a* and 15*b* results in an increase in size of the manual feed tray 5, a space for arranging the manual feed tray 5 and a space for pivoting the manual feed tray 5 by further protruding the tray pivot shaft 501 to the right side (the outward side in the first direction) of the apparatus body 201A than the door pivot shaft 601. In addition, there is a concern that a component may be damaged due to a difference in pivot trajectory between the door 6 and the manual feed tray 5. In this regard, since the door operating portion 600 is covered by the manual feed tray 5 in a state where the door 6 and the manual feed tray 5 are closed, a possibility of an erroneous operation can be reduced.

Hitherto, when a large-sized sheet is handled on the manual feed tray 5, an extension tray provided in the manual feed tray 5 in a drawable manner has often been used. In the present embodiment, the blowing nozzles 16*a* to 16*d* are provided in the side end regulating plates 14*a* and 14*b* as paths for blowing loosening air, and the length of the manual feed tray 5 is also set to a length capable of placing a large-sized sheet without using an extension tray. Specifically, the length of the manual feed tray 5 in the sheet feeding direction of the pickup roller 502 is larger than the width of the recess portion 6*c* of the door 6 in the up-down direction in a state where the door 6 is closed. As described above, by further protruding the tray pivot shaft 501 to the right side of the apparatus body 201A than the door pivot shaft 601, it is easy to secure a space for arranging the manual feed tray 5 and a space for pivoting the manual feed tray 5, the manual feed tray 5 having a larger size than the recess portion 6*c*.

OTHER EXAMPLES

In the present embodiment, the configuration in which the pivot center of the door 6 (the center line of the door pivot shaft 601) and the pivot center of the manual feed tray 5 (the center line of the tray pivot shaft 501) are parallel to each other, and their positions as viewed in the axial direction (in the front view of the image forming apparatus 201) are different from each other has been exemplified. Not limited thereto, the relationship between the door pivot shaft 601 and the tray pivot shaft 501 can be changed according to the specific configurations of the door 6 and the manual feed tray 5. For example, when the sizes of the side end regulating plates 14*a* and 14*b* and the blowing nozzles 16*a* to 16*d* are small, the tray pivot shaft 501 may be close to the door pivot shaft 601. The door pivot shaft 601 and the tray pivot shaft 501 may overlap each other as viewed in the axial direction. In addition, the door pivot shaft 601 may be disposed, for example, at an upper end of the door 6. The door pivot shaft 601 and the tray pivot shaft 501 may have different angles.

In the present embodiment, the configuration in which the blowing fans 15*a* and 15*b* are mounted on the manual feed tray 5 has been exemplified, but the manual feed tray 5 may not include blowing fans 15*a* and 15*b*.

As described above, according to the present disclosure, it is possible to provide an image forming apparatus that is less likely to be erroneously operated.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-048584, filed on Mar. 24, 2023, which is hereby incorporated by reference herein in its entirety.

What is claimed is:

1. An image forming apparatus comprising:

an image forming unit configured to form an image on a sheet and including a transfer nip at which the image is transferred on the sheet;

an apparatus body configured to house the image forming unit;

an opening/closing unit provided in a side surface of the apparatus body and configured to be openable and closable between:

a first closed position at which the opening/closing unit is closed with respect to the apparatus body and the transfer nip is formed; and a first opened position at which the opening/closing unit is opened with respect to the apparatus body and the transfer nip is separated; and a sheet supporting portion configured to be openable and closable between:

a second closed position at which the sheet supporting portion is closed with respect to the opening/closing unit; and a second opened position at which the sheet supporting portion is opened to allow the sheet to be supported on the sheet supporting portion, wherein at least a portion of the sheet supporting portion protrudes outside of the opening/closing unit in a first direction, which is perpendicular to the side surface of the apparatus body and which is directed from the side surface toward outside of the apparatus body, in a state where the opening/closing unit is in the first closed position and the sheet supporting portion is in the second closed position, wherein the opening/closing unit includes a grip portion configured to be gripped to move the opening/closing unit from the first closed position to the first opened position, and wherein as the image forming apparatus is viewed in a second direction opposite to the first direction in the state where the opening/closing unit is in the first closed position and the sheet supporting portion is in the second closed position, a portion of the opening/closing unit is disposed to not overlap the sheet supporting portion, and the grip portion of the opening/closing unit is disposed to overlap the sheet supporting portion.

2. The image forming apparatus according to claim 1, wherein:

the opening/closing unit is configured to pivot about a first axis, and the sheet supporting portion is configured to pivot about a second axis different from the first axis.

3. The image forming apparatus according to claim 2, wherein the first axis and the second axis are parallel to each other.

4. The image forming apparatus according to claim 3, wherein the second axis is located outside the first axis in the first direction.

5. The image forming apparatus according to claim 1, wherein:

the opening/closing unit includes:

an outside surface facing toward the first direction in a state where the opening/closing unit is in the first closed position; and a recess portion recessed with respect to the outside surface, and the grip portion is disposed on the outside surface.

6. The image forming apparatus according to claim 5, wherein:

the grip portion is disposed above the recess portion, the sheet supporting portion is configured to pivot about a pivot center below the recess portion, and the sheet supporting portion extends to a position above an upper edge of the recess portion in the state where the opening/closing unit is in the first closed position and the sheet supporting portion is in the second closed position.

7. The image forming apparatus according to claim 5, further comprising:

a side end regulating member supported by the sheet supporting portion and configured to regulate a position of the sheet supported on the sheet supporting portion in a sheet width direction orthogonal to a sheet feeding direction, wherein at least a portion of the side end regulating member is accommodated in the recess portion in the state where the opening/closing unit is in the first closed position and the sheet supporting portion is in the second closed position.

8. The image forming apparatus according to claim 5, wherein:

the sheet supporting portion includes a support surface configured to support the sheet, and a length of the support surface in a sheet feeding direction is longer than a width of the recess portion in an up-down direction in the state where the opening/closing unit is in the first closed position.

9. The image forming apparatus according to claim 1, wherein:

the sheet supporting portion includes a support surface configured to support the sheet, and in the state where the opening/closing unit is in the first closed position and the sheet supporting portion is in the second closed position, the support surface projects outside of the opening/closing unit in the first direction.

10. The image forming apparatus according to claim 1, further comprising a blowing fan supported by the sheet supporting portion and configured to blow wind to sheets supported on the sheet supporting portion to separate the sheets from each other.

11. The image forming apparatus according to claim 10, wherein the blowing fan is located outside of the opening/closing unit in the first direction in the state where the opening/closing unit is in the first closed position and the sheet supporting portion is in the second closed position.

12. The image forming apparatus according to claim 10, wherein:

the opening/closing unit is configured to pivot about a first axis passing through a lower end of the opening/closing unit in a state where the opening/closing unit is in the first closed position, the sheet supporting portion is configured to pivot about a second axis passing through a lower end of the sheet supporting portion in a state where the sheet supporting portion is in the second closed position, and the second axis is located outside the first axis in the first direction.

13. The image forming apparatus according to claim 10, further comprising:

a side end regulating member supported by the sheet supporting portion and configured to regulate a position of the sheet supported on the sheet supporting portion in a sheet width direction orthogonal to a sheet feeding direction, wherein the side end regulating member has an opening portion through which wind is blown from the blowing fan toward the sheets supported on the sheet supporting portion.

14. The image forming apparatus according to claim 13, wherein:

the opening/closing unit includes:

an outside surface facing toward the first direction in a state where the opening/closing unit is in the first closed position; and a recess portion recessed with respect to the outside surface, at least a portion of the side end regulating member is accommodated in the recess portion in the state where the opening/closing unit is in the first closed position and the sheet supporting portion is in the second closed position, and a length of the sheet supporting portion in a sheet feeding direction is longer than a width of the recess portion in an up-down direction in the state where the opening/closing unit is in the first closed position.

15. The image forming apparatus according to claim 10, wherein the image forming apparatus is configured to continuously feed a plurality of sheets of coated paper placed on the sheet supporting portion while blowing wind to the plurality of sheets of coated paper by using the blowing fan.

16. The image forming apparatus according to claim 1, wherein the opening/closing unit:

includes a plurality of conveyance guides configured to form a conveyance path for the sheet on which the image is formed by the image forming unit;

includes a plurality of conveyance rollers configured to convey the sheet along the conveyance path; and has a larger area than the sheet supporting portion as viewed in the second direction in the state where the opening/closing unit is in the first closed position and the sheet supporting portion is in the second closed position.

17. The image forming apparatus according to claim 1, wherein the sheet supporting portion is a manual feed tray on which the sheet is placeable from outside of the image forming apparatus.

* * * * *